(12) United States Patent
Arai

(10) Patent No.: US 8,547,708 B2
(45) Date of Patent: Oct. 1, 2013

(54) ELECTRONIC APPARATUS

(75) Inventor: Naohiro Arai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 12/973,104

(22) Filed: Dec. 20, 2010

(65) Prior Publication Data

US 2011/0149542 A1    Jun. 23, 2011

(30) Foreign Application Priority Data

Dec. 22, 2009    (JP) ................................ 2009-291239

(51) Int. Cl.
*H05K 7/02* (2006.01)
*H05K 7/04* (2006.01)

(52) U.S. Cl.
USPC ........................ 361/807; 361/809; 361/810

(58) Field of Classification Search
USPC .................. 361/807.809, 810, 735, 790, 792, 361/807, 809
See application file for complete search history.

(56) References Cited

U.S. PATENT DOCUMENTS

| 5,574,625 | A   | * | 11/1996 | Ohgami et al. | 361/679.09 |
| 6,287,143 | B1  | * | 9/2001  | Lwee | 439/541.5 |
| 6,527,562 | B2  | * | 3/2003  | Tanaka et al. | 439/65 |
| 6,625,016 | B2  | * | 9/2003  | Glusing et al. | 361/679.41 |
| 6,837,439 | B2  | * | 1/2005  | Kitchen | 235/492 |
| 6,942,153 | B1  | * | 9/2005  | Yuan et al. | 235/472.01 |
| 7,347,700 | B2  | * | 3/2008  | Miyamoto et al. | 439/68 |
| 8,243,458 | B2  | * | 8/2012  | Chen et al. | 361/752 |
| 2008/0090446 | A1 | * | 4/2008 | Lamont et al. | 439/351 |

FOREIGN PATENT DOCUMENTS

| CN | 2615768 Y | 5/2004 |
| JP | 2000-195991 A | 7/2000 |

* cited by examiner

*Primary Examiner* — Hung S Bui
(74) *Attorney, Agent, or Firm* — Canon USA Inc. IP Division

(57) ABSTRACT

An electronic apparatus includes a card board on which a card slot at least a part of which is formed of metal and into which a recording medium can be inserted is mounted, and a memory board on which memories are mounted. The card board is disposed facing to a surface of the memory board on which the memories are mounted, and the card slot and at least a part of the memories are disposed so as to be overlapped when viewing from a direction orthogonal to the board surface of the card board.

6 Claims, 10 Drawing Sheets

ELECTRONIC APPARATUS

BACKGROUND OF THE INVENTION

1. Field of the Invention

The present invention relates to an electronic apparatus. More specifically, the present invention is preferably used for an electronic apparatus on which a card slot, into which an electric element such as a built-in memory and a recording medium are inserted, is equipped.

2. Description of the Related Art

There is an electronic apparatus on which an electric element such as a built-in memory is equipped. In such an electronic apparatus, in order to reduce an influence of an unnecessary radiation noise emitted from the built-in memory or an unnecessary radiation noise given to the built-in memory from outside, the built-in memory or the periphery of a board, on which the built-in memory is mounted, is required to be shielded.

Further, for example, in a technique discussed in Japanese Patent Application Laid-Open No. 2000-195991, a pin for an unnecessary radiation measure is added to a board on which an built-in memory element is mounted, thereby strengthening a ground layer. Thus, an unnecessary radiation is reduced.

However, there is a problem that a product cost is increased and a product itself becomes larger in size when the shield member or the placing pin for the unnecessary radiation measure is added.

SUMMARY OF THE INVENTION

According to an aspect of the present invention, an electronic apparatus includes a cardboard on which a card slot at least a part of which is formed out of metal and into which a recording medium can be inserted is mounted, and a memory board on which a memory is mounted, wherein the cardboard is disposed opposite to a face on which the memory is mounted, and the card slot and at least a part of the memory are disposed so as to be overlapped when viewing from a direction orthogonal to the board surface of the card board.

According to the present invention, in an electronic apparatus on which an electric element and a card slot are equipped, an unnecessary radiation noise that the electric element receives from outside or an unnecessary radiation noise that the electric element emits outside can be suppressed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 9:
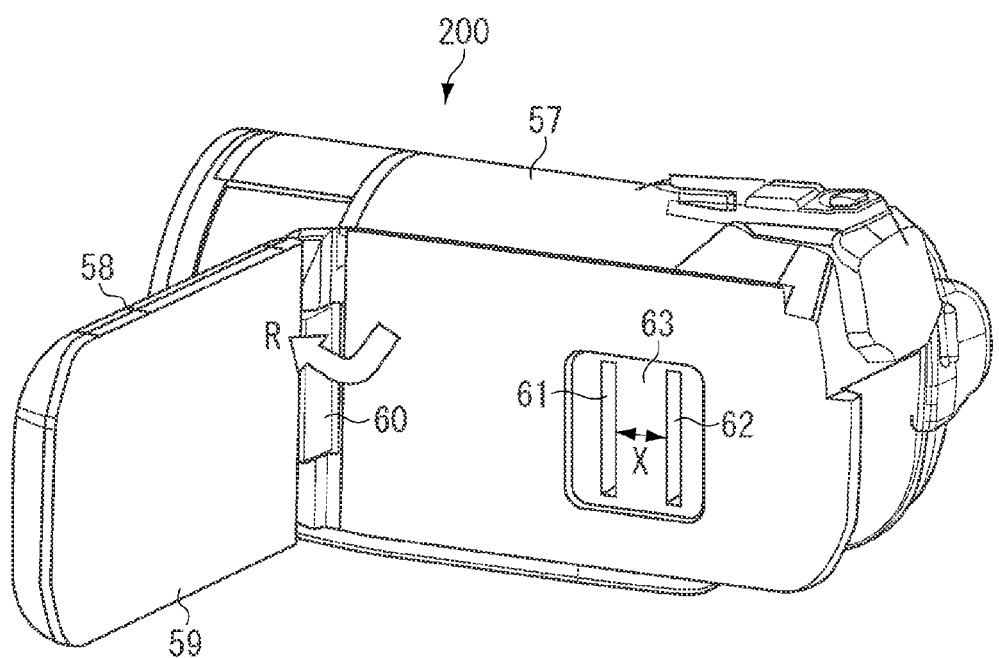
FIG. 9 illustrates a layout of the exterior of an imaging apparatus.
Figure 10:
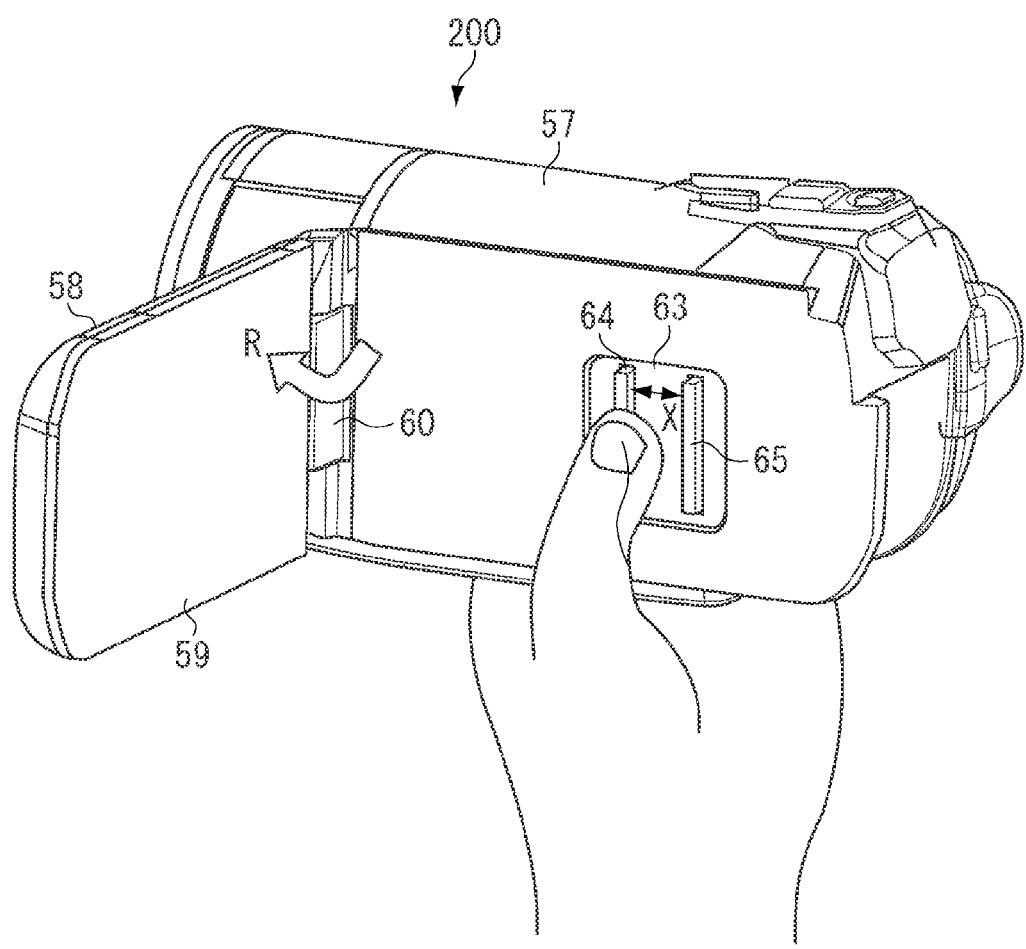
FIG. 10 illustrates a state when a card is inserted or extracted in an imaging apparatus.

In the present exemplary embodiment, as an electronic apparatus, a digital video camera as illustrated in FIGS. 9 and 10 will be adopted and described.

Inside the digital video camera illustrated in FIGS. 9 and 10, a memory board (element board), on which a memory element as an electric element is mounted, and a board (card board) on which a card slot, into which a recording medium such as a secure digital (SD) card can be inserted, is mounted, are equipped. In the card slot, at least a part thereof is formed of metal.

In the present exemplary embodiment, a recording medium is fully inserted into a card slot by inserting half the recording medium into the card slot and further pushing the recording medium in an insertion direction. On the other hand, the recording medium results in a state in which half the recording medium is inserted in the card slot by pushing, in the insertion direction, the recording medium that is fully inserted into the card slot. Then, the recording medium can be extracted from the card slot by picking up the recording medium half projected from the card slot.

Figure 1:
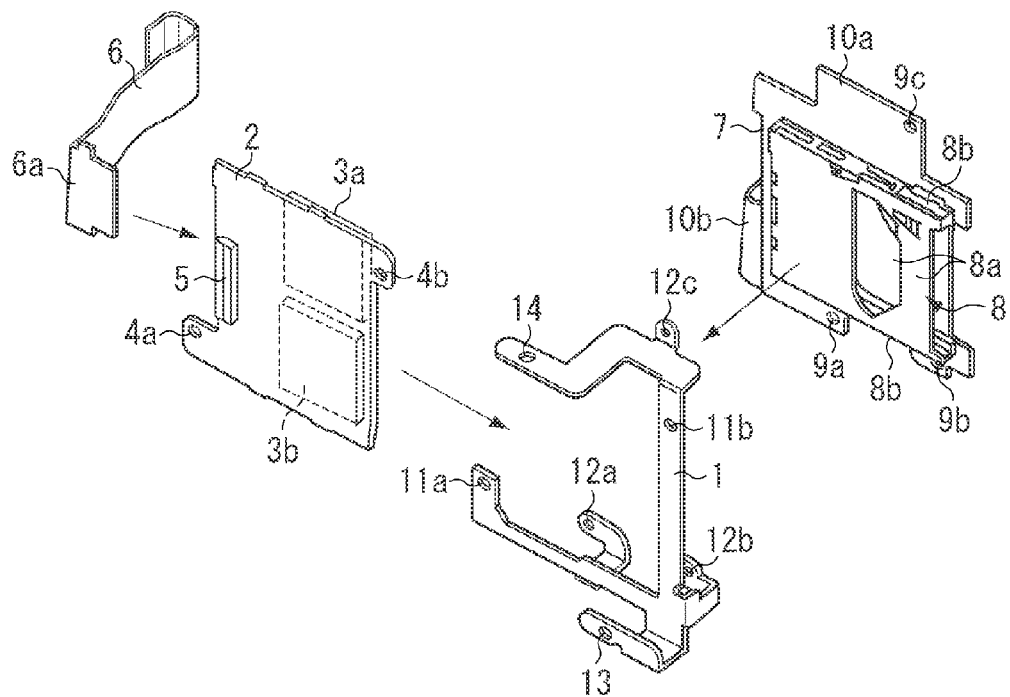
FIG. 1 is an exploded perspective view illustrating a configuration of the periphery of a memory board according to a first exemplary embodiment of the present invention.

In a first exemplary embodiment, a memory board, on one surface of which a memory element is mounted, is used. FIG. 1 is an exploded perspective view illustrating the configuration of the periphery of a memory board according to a first exemplary embodiment.

As illustrated in FIG. 1, on one face of a memory board 2, memory elements 3a and 3b (hereinafter, referred to as memory) as an electric element to be built-in in a digital video camera are mounted in parallel. Mounting portions 4a and 4b of the memory board 2 are secured to the corresponding positions 11a and 11b on a memory retention metal plate 1 with screws. Thus, the memory board 2 is installed in the memory retention metal plate 1.

The memory board 2 is mounted with a connector 5. The connector 5 is engaged with one end 6a of a memory flexible board 6 for electrically connecting with a main board, which will be described later.

In the present exemplary embodiment, a rigid flexible board 7 is disposed adjacently to the memory board 2. The rigid flexible board 7 is a board integrated with a rigid board portion 10a (card board) and a flexible portion 10b. On one surface of the rigid board portion 10a, a metal-made card slot 8, into which an SD card is inserted and from which the SD card is extracted, is mounted.

The card slot 8 has a pair of side walls 8a parallel to the rigid board portion 10a and a pair of plate portions 8b which connects respective ends of these side walls 8a. Into a space surrounded by the side walls 8a and the plate portions 8b, the SD card is inserted. The side wall 8a and the plate portion 8b are formed by bending a metal plate.

The rigid flexible board 7 is attached to the memory retention metal plate 1 by securing mounting portions 9a, 9b, and 9c of the rigid flexible board 7 to the corresponding positions 12a, 12b, and 12c of the memory retention metal plate 1 with screws. Further, at the tip of the flexible portion 10b of the rigid flexible board 7, a connector 10c is mounted (refer to FIGS. 2 and 4). The connector 10c can be electrically connected with the main board, which will be described below.

The memory retention metal plate 1 (retention member) is formed by bending. The memory retention metal plate 1 retains the memory board 2 and the rigid flexible board 7 at a predetermined position and at a predetermined interval. Further, the memory retention metal plate 1 has mounting portions 13 and 14. The memory retention metal plate 1 is fixed to a main body metal plate, which will be described later, via the mounting portions 13 and 14.

Figure 2:
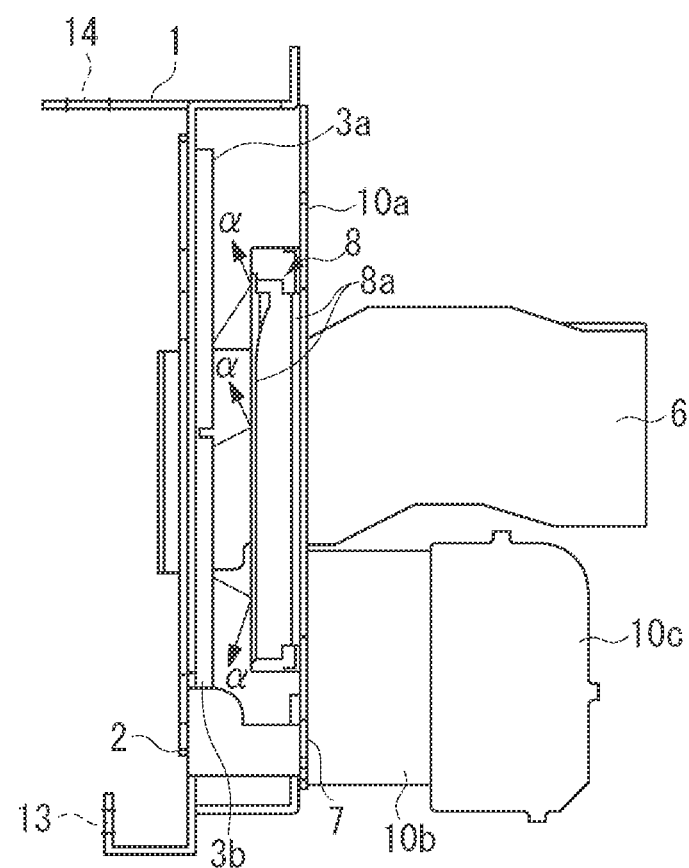
FIG. 2 is a side elevation view illustrating the configuration of the periphery of the memory board according to the first exemplary embodiment.

FIG. 2 illustrates a state in which the memory board 2 and the rigid flexible board 7 are fixed to the memory retention metal plate 1.

As illustrated in FIG. 2, in the memory board 2, the memories 3a and 3b are mounted on the surface of the opposite side to the rigid flexible board 7. On the other hand, in the rigid flexible board 7, the card slot 8 is mounted on the surface of the opposite side to the memory board 2. Accordingly, with the memory board 2 and the rigid flexible board 7 being fixed in the memory retention metal plate 1, the memories 3a and 3b, and the card slot 8 have a positional relationship to be opposed each other.

Particularly, the memory retention metal plate 1 in the present exemplary embodiment is retained so that the memory board 2 and the rigid board portion 10a become roughly parallel. Thus, the memories 3a and 3b, and the card slot 8 are disposed roughly in parallel.

Figure 3:
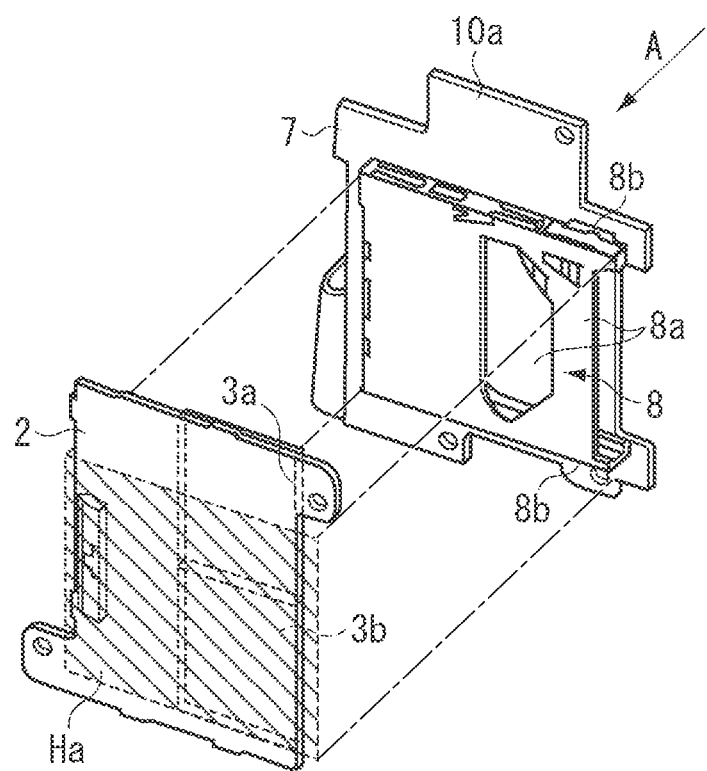
FIG. 3 is a perspective view illustrating a positional relationship between a card slot and a memory according to the first exemplary embodiment.

A positional relationship between the memories 3a and 3b, and the card slot 8 will specifically be described referring to FIG. 3. FIG. 3 is a perspective view of the memory board 2 and the rigid board portion 10b retained by the memory retention metal plate 1 spaced in a direction orthogonal to both board surfaces as illustrated in FIG. 2.

Further, FIG. 3 illustrates with hatching Ha a projection plane in which the card slot 8 is projected from a direction of arrow A orthogonal to the rigid board portion 10a onto the memory board 2. The hatching Ha is overlapped with at least a part of the memories 3a and 3b mounted on the memory board 2. More particularly, when viewing from the direction of arrow A, at least a part of the memories 3a and 3b, and the card slot 8 are disposed so as to be overlapped.

As illustrated in FIG. 2, an unnecessary radiation noise a emitted from the memories 3a and 3b is blocked with the side wall 8a of the metal-made card slot 8 by disposing the memories 3a and 3b, and the card slot 8 as described above. Thus, it is not leaked outside. Further, an unnecessary radiation noise which enters from outside is blocked with the side wall 8a of the card slot 8 which is mainly formed of metal. Thus, the memories 3a and 3b are not affected by the unnecessary radiation noise.

The larger an area to be overlapped between the memories 3a and 3b, and the card slot 8 becomes, the higher the blocking effect of the unnecessary radiation noise becomes. However, as illustrated in FIG. 3, if half or more of the memories 3a and 3b is overlapped, a certain level of blocking effect can be anticipated.

Figure 4:
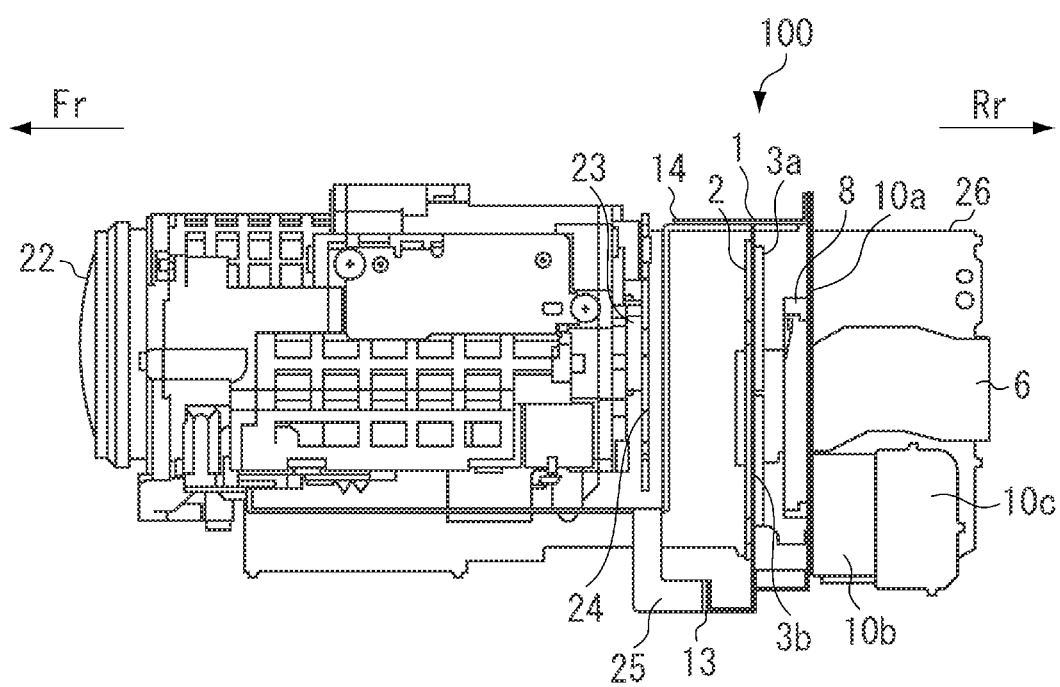
FIG. 4 illustrates a layout configuration of the inside of an imaging apparatus according to the first exemplary embodiment.

Next, a layout when the memory board 2 and the rigid flexible board 7 integrated by the memory retention metal plate 1 are equipped inside a digital video camera 100 will be described referring to FIG. 4. FIG. 4 is a diagram illustrating the state where the case of the digital video camera 100 is removed. In FIG. 4, a shooting direction is indicated by Fr as the front direction and a direction opposite thereto is indicated by Rr as the rear direction.

As illustrated in FIG. 4, the digital video camera 100 includes an imaging optical system containing a lens 22, a sensor 23, and a sensor board 24 on which the sensor 23 is mounted. Further, the digital video camera 100 includes a main board 26 at the rear thereof.

The memory retention metal plate 1 in which the memory board 2 and the rigid flexible board 7 are fixed is secured to a main body metal plate 25 with screws via the mounting portions 13 and 14. At this time, the memory board 2 and the rigid board portion 10a are disposed along a direction orthogonal to a shooting direction. The memory board 2 is electrically connected to the main board 26 via the memory flexible board 6. The rigid flexible board 7 is connected to the main board 26 via the connector 10c of the flexible portion 10b.

Image information imaged by the imaging optical system is transmitted to the main board 26 thorough a flexible board (not illustrated) that electrically connects the sensor board 24 and the main board 26. The transmitted image information is subjected to various types of image processing in the main board 26, and then written into the memories 3a and 3b on the memory board 2 via the memory flexible board 6.

Further, with the SD card being inserted into the card slot 8, the image information is written into the SD card inserted into the card slot 8 via the flexible portion 10b of the rigid flexible board 7.

Thus, according to the present exemplary embodiment, with the configuration described above, an unnecessary radiation noise emitted from a memory or an unnecessary radiation noise received by a memory from outside can be suppressed without adding new parts.

A second exemplary embodiment includes a memory board, on each surface of which a memory is mounted, and two card slots.

Figure 5:
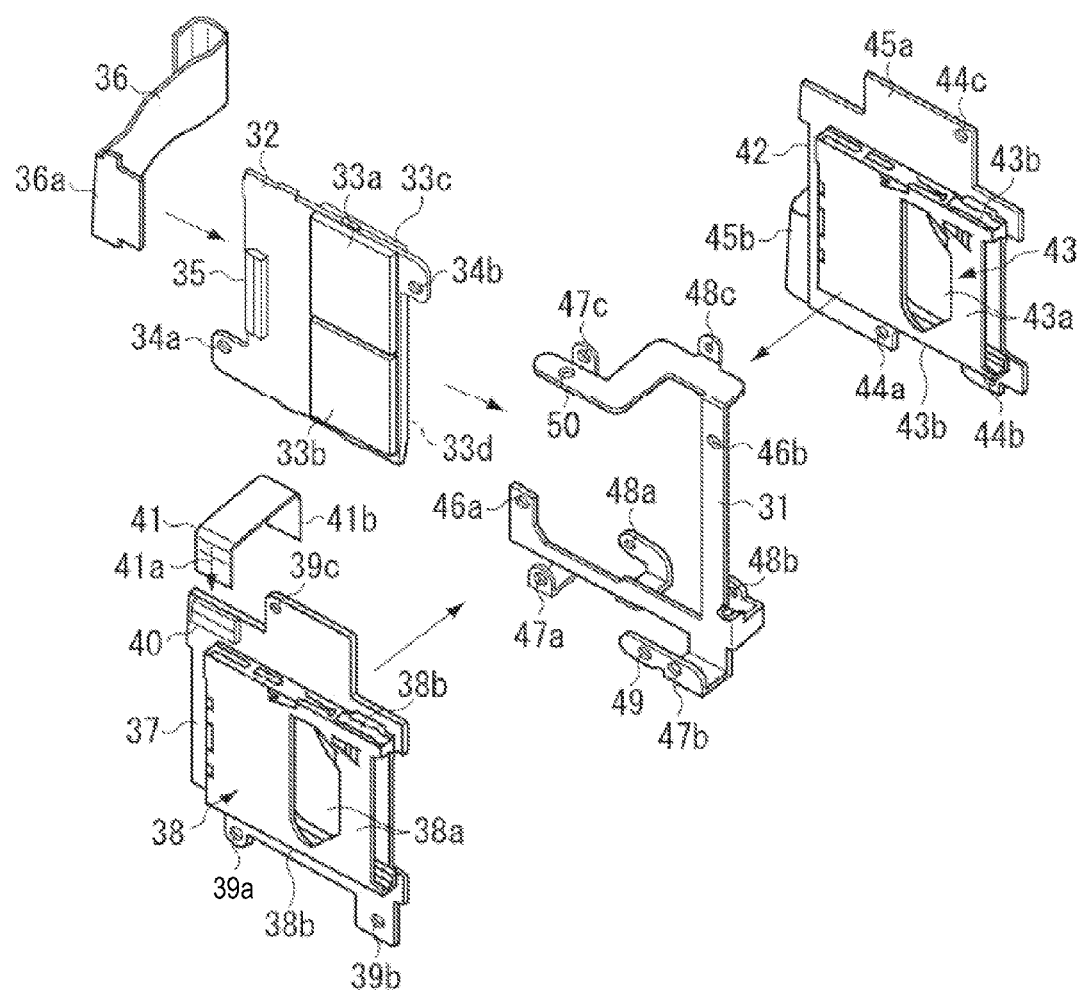
FIG. 5 is an exploded perspective view illustrating a configuration of the periphery of a memory board according to a second exemplary embodiment of the present invention.

FIG. 5 is an exploded perspective view illustrating a configuration of the periphery of a memory board according to the second exemplary embodiment. As illustrated in FIG. 5, on each of both surfaces of a memory board 32, memories 33a to 33d as an electric element built-in in a digital video camera are mounted. On one surface of the memory board 32, memories 33a and 33b are mounted in parallel and on another surface, memories 33c and 33d are mounted in parallel.

The memory board 32 is fixed in a memory retention metal plate 31 by securing mounting portions 34a and 34b of the memory board 32 to corresponding positions 46a and 46b of the memory retention metal plate 31 with screws. The memory board 32 is mounted with a connector 35. The connector 35 is engaged with one end 36a of a memory flexible board 36 in order to electrically connect with a main board, which will be described later.

In the present exemplary embodiment, a card board 37 (first card board) and a rigid flexible board 42 are disposed adjacently to the memory board 32. On one surface of the card board 37, a metal-made first card slot 38 into which an SD card is inserted and from which the SD card is extracted is mounted. The card slot 38 has a pair of side walls 38a that is parallel to the card board 37 and a pair of plate portions 38b which connects respective ends of the side walls 38a.

Into a space surrounded by the side walls 38a and the plate portions 38b, the SD card is inserted. The side walls 38a and the plate portion 38b of the first card slot 38 are formed by bending a metal plate. The card board 37 is fixed to the memory retention metal plate 31 by securing mounting portions 39a, 39b, and 39c of the card board 37 to the corresponding positions 47a, 47b, and 47c of the memory retention metal plate 31 with a screw.

Further, the rigid flexible board 42 is a board integrated with a rigid board portion 45a (second card board) and a flexible portion 45b. On one surface of the rigid board portion 45a, a metal-made second card slot 43 into which an SD card is inserted and from which the SD card is extracted is mounted.

The card slot 43 has a pair of side walls 43a parallel to the rigid board portion 45a and a pair of plate portions 43b which connects respective ends of these side walls 43a. Into a space surrounded by the side walls 43a and the plate portions 43b, the SD card is inserted.

The side walls 43a and the plate portion 43b of the second card slot 43 are formed by bending a metal plate. The rigid flexible board 42 is fixed to the memory retention metal plate 31 by securing mounting portions 44a, 44b, and 44c of the rigid flexible board 42 to the corresponding positions 48a, 48b, and 48c of the memory retention metal plate 31 with screws.

Figure 6:
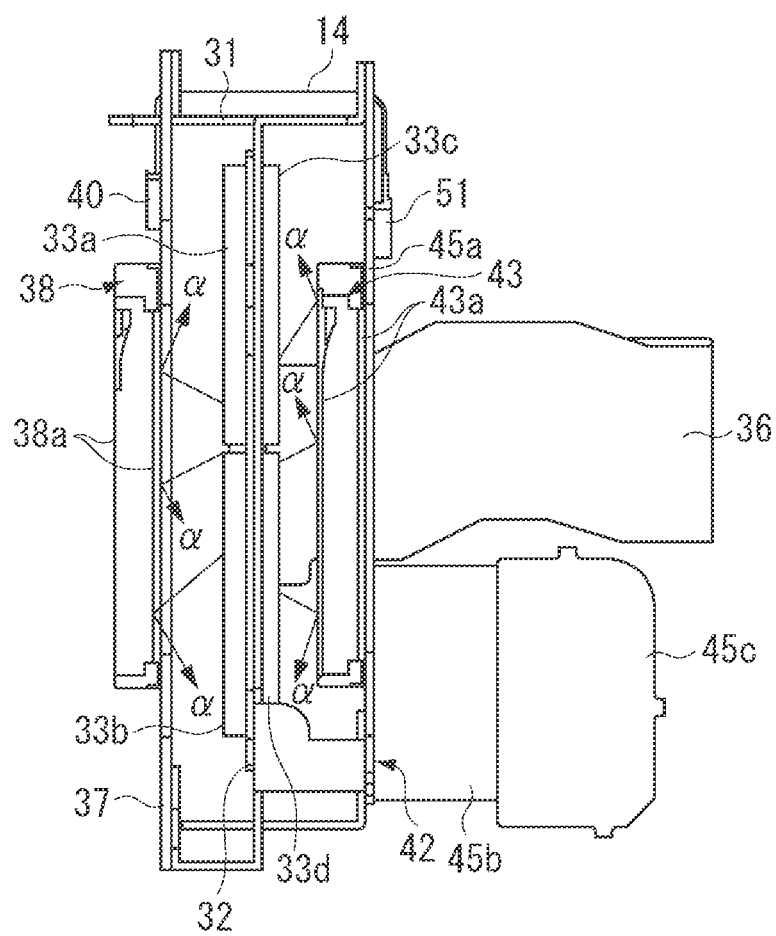
FIG. 6 is a side elevation view illustrating the configuration of the periphery of the memory board according to the second exemplary embodiment.
Figure 8:
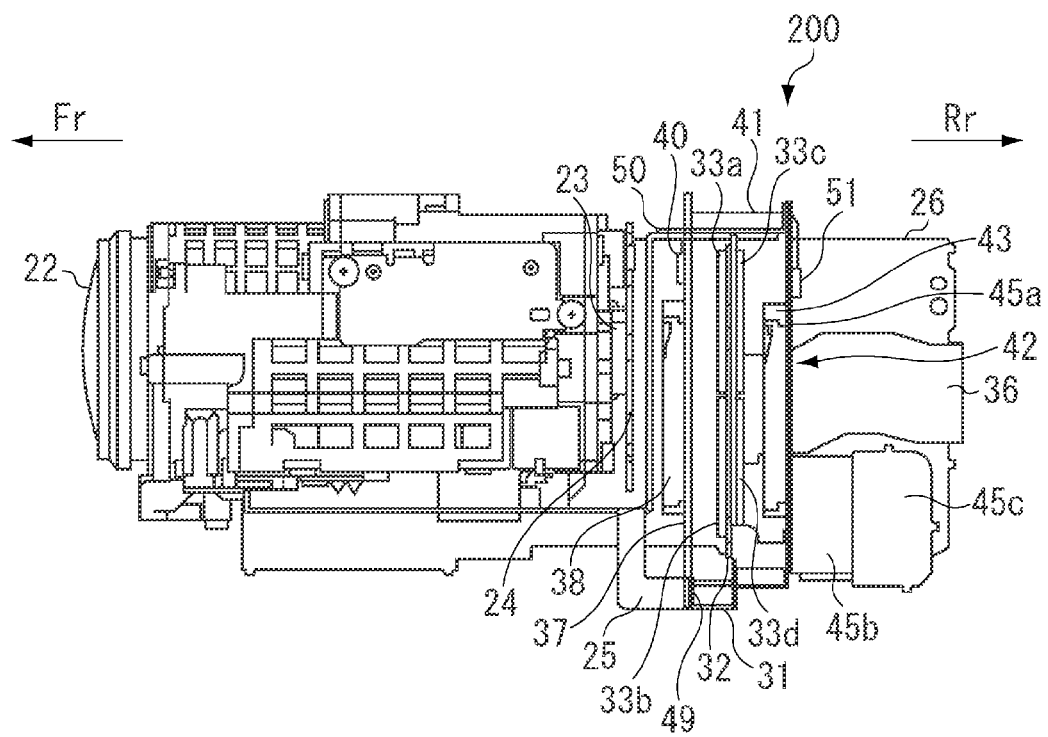
FIG. 8 illustrates a layout configuration of the inside of an imaging apparatus according to the second exemplary embodiment.

Further, at the tip of the flexible portion 45b of the rigid flexible board 42, a connector 45c is mounted (refer to FIGS. 6 and 8). The connector 45c can be electrically connected with the main board which will be described below.

A card flexible board 41 electrically connects the card board 37 and the rigid flexible board 42. Specifically, one end 41a of the card flexible board 41 is engaged with a connector 40 mounted on the card board 37, and another end 41b is engaged with a connector 51 (refer to FIGS. 6 and 8) mounted on the rigid board portion 42.

The memory retention metal plate 31 (retention member) is formed by bending. The memory retention metal plate 31 retains the memory board 32, the cardboard 37, and the rigid flexible board 42 at a predetermined position and at a predetermined interval. Further, the memory retention metal plate 31 has mounting portions 49 and 50. The memory retention metal plate 31 is fixed to a main body metal plate, which will be described later, via these mounting portions 49 and 50.

FIG. 6 illustrates a state in which the memory board 32, the card board 37, and the rigid flexible board 42 are fixed in the memory retention metal plate 31.

As illustrated in FIG. 6, the memory board 32 is retained by the memory retention metal plate 31 sandwiched between the card board 37 and the rigid board portion 45a of the rigid flexible board 42. Accordingly, the memory board 32 is in a state sandwiched between the card slot 38 and the card slot 43.

Particularly, the memory retention metal plate 31 in the present exemplary embodiment is retained so that the memory board 32, the card board 37, and the rigid board portion 45a become roughly parallel. Thus, the memories 33a to 33d, the card slot 38, and the card slot 43 are disposed roughly in parallel.

Further, the memories 33a and 33b on the memory board 32 are mounted on the surface on the side facing to the card board 37 in the memory board 32. On the other hand, the card slot 38 is mounted on the surface on the opposite side to the side facing to the memory board 32 in the card board 37. Accordingly, the memories 33a and 33b, and the card slot 38 have a positional relationship facing with each other across the card board 37.

Furthermore, the memories 33c and 33d on the memory board 32 are mounted on the surface on the side facing to the rigid board portion 45a of the memory board 32. On the other hand, the card slot 43 is mounted on the side facing to the memory board 32 in the rigid board portion 45a. Accordingly, the memories 33c and 33d, and the card slot 43 have a positional relationship to be opposed each other.

Figure 7:
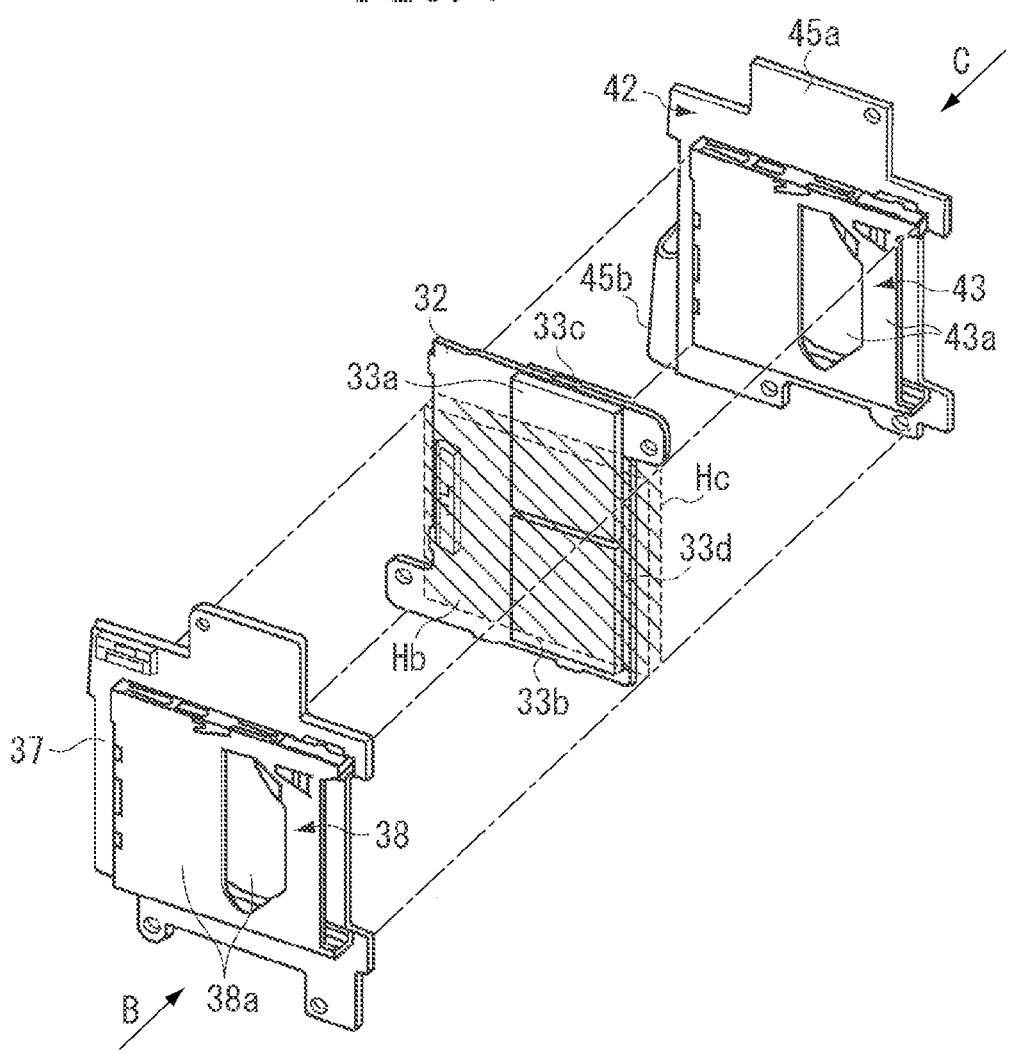
FIG. 7 is a perspective view illustrating a positional relationship between a card slot and a memory according to the second exemplary embodiment.

A positional relationship between the memories 33a and 33b, and the card slot 38, and a positional relationship between the memories 33c and 33d, and the card slot 43 will specifically be described referring to FIG. 7.

FIG. 7 is a perspective view illustrating the memory board 32, the card board 37, and the rigid board portion 45a retained by the memory retention metal plate 31 spaced in a direction orthogonal to each board surface as illustrated in FIG. 6.

Further, FIG. 7 illustrates with hatching Hb a projection plane in which the card slot 38 is projected from a direction of arrow B orthogonal to the card board 37 onto the memory board 32. The hatching Hb is overlapped with at least a part of the memories 33a and 33b mounted on the memory board 32. More particularly, when viewing from the direction of arrow B, at least a part of the memories 33a and 33b, and the card slot 38 are disposed so as to be overlapped.

Furthermore, FIG. 7 illustrates with hatching Hc a projection plane in which the card slot 43 is projected from a direction of arrow C orthogonal to the rigid board portion 45a onto the memory board 32. The hatching Hc is overlapped with at least a part of the memories 33c and 33d mounted on the memory board 32. More specifically, when viewing from the direction of arrow C, at least a part of the memories 33c and 33d, and the card slot 43 are disposed to be overlapped.

Still furthermore, in the present exemplary embodiment, when viewing from the direction of arrow B or arrow C, the hatching Hb and the hatching Hc are overlapped. In other words, when viewing from the direction of arrow B or arrow C, the card slot 38 and the card slot 43 are disposed at the same position.

Accordingly, in the present exemplary embodiment, as illustrated in FIG. 6, an unnecessary radiation noise a emitted from the memories 33a and 33d is blocked with the side walls 38a of the metal-made card slot 38 and the side walls 43a of the card slot 43. Thus, it is not leaked outside.

Further, an unnecessary radiation noise which enters from outside is blocked with the side walls 38a of the metal-made card slot 38 and the side walls 43a of the card slot 43. Thus, the memories 33a and 33d are not affected by the unnecessary radiation noise.

The larger an area to be overlapped between the memories 33a and 33b, and the card slot 38, and between the memories 33c and 33d and the card slot 43 becomes, the higher the blocking effect of the unnecessary radiation noise becomes. However, as illustrated in FIG. 7, if half or more of the memories 33a to 33d is overlapped, a fixed blocking effect can be anticipated.

Next, a layout when the memory board 32, the cardboard 37, and the rigid flexible board 42 integrated by the memory retention metal plate 31 are equipped inside a digital video camera will be described referring to FIG. 8.

FIG. 8 is a diagram illustrating a state where a case of a digital video camera 200 is removed. In FIG. 4, a shooting direction is indicated by Fr as the front direction and a direction opposite thereto is indicated by Rr as the rear direction. In the drawings, elements and parts which are identical to the first exemplary embodiment are designated by identical reference numerals, and duplicate description thereof is omitted.

The memory retention metal plate 31 to which the memory board 32, the card board 37, and the rigid flexible board 42 are fixed is secured to the main body metal plate 25 with screws via the mounting portions 49 and 50. At this time, the memory board 32, the card board 37, and the rigid board portion 45a are disposed along a direction orthogonal to a shooting direction.

The memory board 32 is connected to the main board 26 via the memory flexible board 36. The rigid flexible board 42 is connected to the main board 26 via the flexible portion 45b.

Image information captured by the imaging optical system is subjected to various types of image processing in the main board 26, and then written into the memories 33a to 33d on the memory board 32 via the memory flexible board 36. Further, with the SD card being inserted into the card slot 43, the image information is written into the SD card inserted into the card slot 43 via the flexible portion 45b of the rigid flexible board 42.

Furthermore, with the SD card being inserted into the card slot 38, the image information transmitted to the rigid flexible board 42 is further transmitted to the card board 37 via the card flexible board 41, and is written into the SD card inserted in the card slot 38.

Next, the digital video camera having an internal layout as described above will be described referring to FIGS. 9 and 10.

As illustrated in FIGS. 9 and 10, with the digital video camera 200, a display unit 58 is attached via a hinge section 60. The display unit 58 is opened in a direction of arrow R about the rotation shaft of the hinge section 60. Thus, a display panel 59 can be exposed.

With the display unit 58 opened, on the left side surface (housing surface of the display unit 58) of the digital video camera 200 main body, openings 61 and 62 for inserting and extracting the SD card, and a concave portion 63 are formed. The opening 61 is communicated with the insertion and extraction port of the card slot 38, and the opening 62 is communicated with the insertion and extraction port of the card slot 43.

The concave portion 63 is provided so that the projection of the SD card slightly projected from the openings 61 and 62 does not contact the display panel 59 when the display unit 58 is closed while the SD card is inserted.

As described above, in the present exemplary embodiment, the memory board 32 is located between the card slot 38 and the card slot 43. Accordingly, as illustrated in FIG. 9, an interval X between the opening 61 corresponding to the card slot 38 and the opening 62 corresponding to the card slot 43 is spaced at a certain interval.

However, if the interval X between the opening 61 and the opening 62 is adjacent, in a case in which two SD cards are inserted into the card slots 38 and 42 of the digital video camera 200, when a user intends to extract an SD card, the user may press both the cards by mistake.

However, in the present exemplary embodiment, the memory board 32 is held between two card slots 38 and 42 to separate the interval X between the opening 61 and the opening 62 with a certain distance. Accordingly, as illustrated in FIG. 10, even if the SD cards 64 and 65 are inserted, when a user intends to extract the SD card 64, the user does not press both the SD cards by mistake.

Thus, according to the present exemplary embodiment, an unnecessary radiation noise emitted from a memory or an unnecessary radiation noise received by a memory from outside can be suppressed without adding new parts with the configuration as described above.

Further, even if the SD cards are inserted into both card slots, it may not be apt to malfunction by being simultaneously pressed, and one SD card can easily be extracted. Furthermore, since a memory is disposed between two card slots, a digital video camera can be reduced in size.

In the first exemplary embodiment, a case in which two memories and one card slot are equipped has been described. In the second exemplary embodiment, a case in which four memories and two card slots are equipped has been described. However, the present invention is not limited thereto. In other words, if a plurality of metal-made card slots to/from each of which a recording medium can be attached and detached is equipped, and a non-attachable and non-detachable type memory is disposed between metal-made card slots, a similar effect can be obtained.

Further, an electric element is not limited to a memory. A board on which other parts that can be affected by an unnecessary radiation noise are mounted may also be effective.

Furthermore, the card slots in the first and the second exemplary embodiments have been described when it is formed out metal. However, a part of the card slot may also be made of metal. Still furthermore, a card slot has been described in a case in which the card slot is rectangular when viewing from a direction to which an SD card is inserted. However, a card slot may also be U-shaped or may also partially be U-shaped.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-291239 filed Dec. 22, 2009, which is hereby incorporated by reference herein in its entirety.

What is claimed is:

1. An electronic apparatus comprising:
    a card slot into which a recording medium can be inserted;
    a card board on which the card slot is mounted;
    a memory; and
    a memory board on which the memory is mounted,
    wherein the card slot has a metal formed portion,
    wherein the card board is disposed facing to a surface of the memory board on which the memory is mounted, and
    wherein the metal formed portion of the card slot is overlapped with at least a part of the memory when viewing from a direction orthogonal to the board surface of the card board.

2. The electronic apparatus according to claim 1, further comprising:
    a retention member configured to retain the card board and the memory board in parallel to each other.

3. The electronic apparatus according to claim 1, further comprising:
    a connector which is mounted on the memory board,
    wherein the metal formed portion of the card slot is overlapped the connector when viewing from a direction orthogonal to the board surface of the card board.

4. An electronic apparatus comprising:
    a first card slot into which a recording medium can be inserted;
    a first card board on which the first card slot is mounted;
    a second card slot into which a recording medium can be inserted;
    a second card board on which the second card slot is mounted;
    a memory; and a memory board on which the memory is mounted, wherein the first card slot has a first metal formed portion, and the second card slot has a second metal formed portion, wherein the first card board is disposed facing to one surface of the memory board on which the memory is mounted, wherein the first metal formed portion of the first card slot is overlapped with at least a part of the memory mounted on the one surface of the memory board when viewing from a direction orthogonal to the board surface of the first card board, and wherein the second card board is disposed facing to another surface of the memory board on which the memory is mounted, and wherein the second metal formed portion of the second card slot is overlapped with at least a part of the memory mounted on the other surface of the memory board when viewing from a direction orthogonal to the board surface of the second card board.

5. The electronic apparatus according to claim 4, further comprising:

a retention member configured to retain the first card board, the second card board, and the memory board in parallel to one another.

6. The electronic apparatus according to claim 4, further comprising:

a connector which is mounted on the memory board, wherein the first metal formed portion of the first card slot is overlapped the connector when viewing from a direction orthogonal to the board surface of the first card board, and wherein the second metal formed portion of the second card slot is overlapped the connector when viewing from a direction orthogonal to the board surface of the second card board.

* * * * *